May 16, 1967 J. E. KRASINSKI 3,319,769
RADIATION DETECTION

Filed April 16, 1965 4 Sheets-Sheet 1

INVENTOR.
John E. Krasinski
BY
Morse, Altman & Oates
ATTORNEYS

May 16, 1967 J. E. KRASINSKI 3,319,769
RADIATION DETECTION
Filed April 16, 1965 4 Sheets-Sheet 2

INVENTOR.
John E. Krasinski
BY
Morse, Altman + Oates
ATTORNEYS

United States Patent Office 3,319,769
Patented May 16, 1967

3,319,769
RADIATION DETECTION
John E. Krasinski, Quincy, Mass., assignor to Baird-Atomic, Inc., Cambridge, Mass., a corporation of Massachusetts
Filed Apr. 16, 1965, Ser. No. 448,722
4 Claims. (Cl. 198—85)

This invention relates to radiation detection and, more particularly, to an automatic sample changing device, capable of sequentially measuring the radioactivity of a comparatively large number of samples. The present invention comprises a magazine mechanism and a transport system, each independently driven and both interconnected by switches and control circuitry to operate synchronously.

The object of the present invention is to provide a highly reliable automatic mechanism, capable of transferring a large number of samples in sequence from a storage magazine to a station where each sample individually can be transported to a radiation detector area, and returned to its original position.

Another object of this invention is to provide a means for removing, adding, or exchanging samples in the magazine, after the automatic sampling process has started. The design of the magazine permits the above to be accomplished without disturbing or mis-aligning adjacent samples. This has a particular advantage in saving time if a sample in the magazine becomes obsolete or additional samples may require testing. The cycling may be stopped at any time, making it unnecessary, in the event such change is desired, to wait for the cycling of the entire complement of samples in the magazine.

Still another object of the invention is the provision of improved efficiency in operation. A sensing device at the transport station signals the transport mechanism whether a sample is in fact there or whether or not the magazine mechanism should continue cycling the sequence of samples. If one or more obsolete samples have been removed from the magazine, no transport time is consumed by the vacant spaces.

Other objects of the present invention will in part be obvious, and will in part appear hereinafter.

This invention accordingly comprises the apparatus possessing the construction, combination of elements and arrangement of parts, which are exemplified in the following detailed disclosure, and the scope of which will be indicated in the claims.

For a fuller understanding of the nature and objects of the present invention, reference should be had to the following detailed description, taken in connection with the accompanying drawings, wherein.

Figure 1:
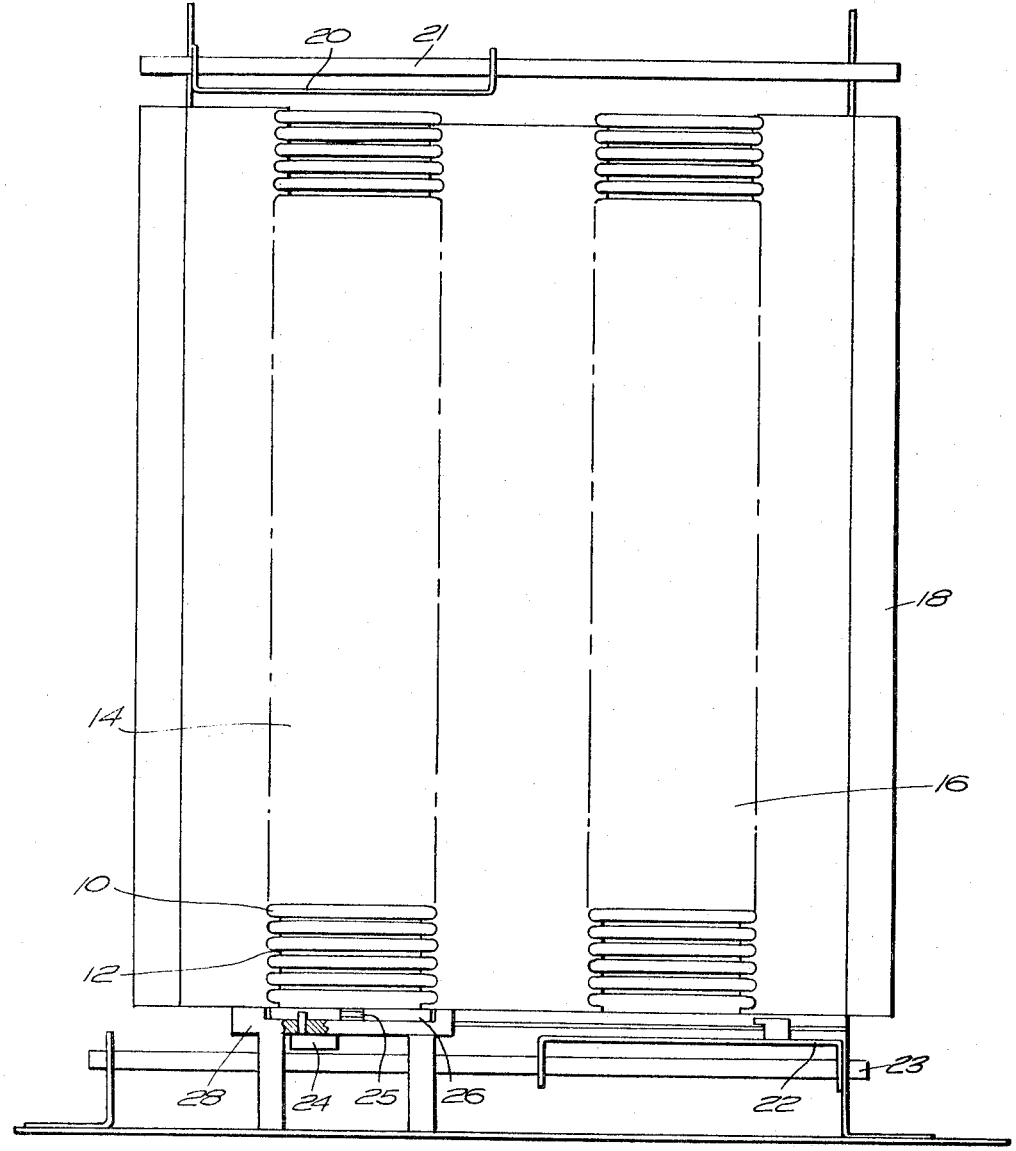
FIG. 1 is a front view of the magazine and shuttle arrangements.

FIG. 1 illustrates magazine 18 as comprising a plurality of sample-holders 10, which are rectangularly shaped wafers, each having a cavity for retaining a radioactive sample. The sample-holders are held by comb-like jaws 12 that are arranged on each side of two vertical columns 14 and 16, each sample-holder being individually supported. In general, jaws 12 are capable of moving each sample-holder sequentially downward in column 16 and sequentially upward in column 14. At the top of magazine 18 is a shuttle 20 shown in FIG. 1 at rest above column 14. The shuttle slides along two rods and moves one sample-holder from the top of column 14 to the top of column 16 once each cycle. As each sample-holder reaches the bottom station in column 16, a shuttle 22 normally at rest at the bottom of column 16 and similar in construction to shuttle 20, advances along two rods 23 and moves a single sample to the base of column 14. The transport station is located at the base of column 14 and is equipped with a sensing switch 24 and a carrier 26. When the presence of a sample is sensed by switch 24 at the transport station, the cycling of the magazine stops and the carrier transports the sample to the detection area at the remote end of a track 28, which is shown at the base of column 14 as extending perpendicularly from the front surface of the magazine to a remote area in a plane parallel to the plane of the sample-holders in the magazine.

The carrier is moved by a transport system and connected by the link 25. A more complete explanation of the transport system and the magazine will be made below.

Figure 2:
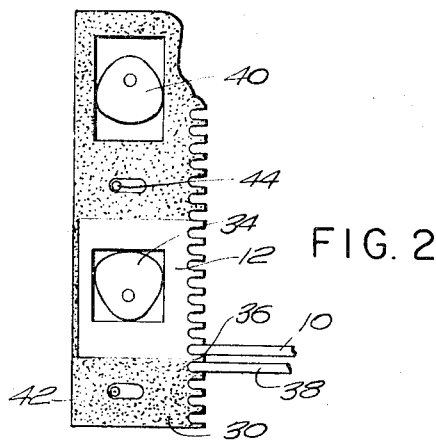
FIG. 2 is a fragmentary detail view of the operation of the cam and jaw-holder, which are components of the apparatus of FIG. 1.

In order to illustrate the motion principle of jaws 12 in magazine 18 as shown in FIG. 1, a fragmentary detail illustrating the basic method of sample-holder advancement is shown in FIG. 2 as involving comb-like jaws 12 and 30. Sample-holder 10 is supported by the teeth of both jaws 12 and 30. A cam 34, driven counter clockwise 90° in a square hole in jaw 12, forces the jaw to move horizontally in a direction away from the sample-holder, leaving it held by jaw 30. Further driving of this cam 180° from its original position moves the jaw 12 in a downward direction so that a jaw tooth 36, which previously supported the sample-holder, now is one station lower than its original station. Driving the cam 270° counter clockwise from its original position moves jaw 12 in to engage a sample-holder 38. Driving the cam 180° from its original position brings jaw holder 12 to its original position, whereby sample-holders 10 and 38 are one station above their original positions. Although cams 40 and 34 are identical and synchronized to operate at the same speed and in the same direction, their high points are mounted 180° apart.

Cam 40 is operated in a rectangular hole in jaw 30 to allow for horizontal motion only. Jaw 30, the holding jaw, also is confined to horizontal travel by a pair of pins 42 and 44. Since cam 40, which drives jaw 30, is 180° out-of-phase from cam 34, jaw 30 is always in position to hold, while jaw 12 lowers to pick up the next sample-holder, As jaw 12 starts on its way up to embrace sample-holders 10 and 38, jaw 30 moves out horizontally to allow the sample-holders to move up one station. It therefore follows that a reversal of the cam motion acts to change the direction and to carry the sample-holders downwardly. Application of this concept will be more fully explained below as it applies specifically to the motions of the magazine.

Figure 3:
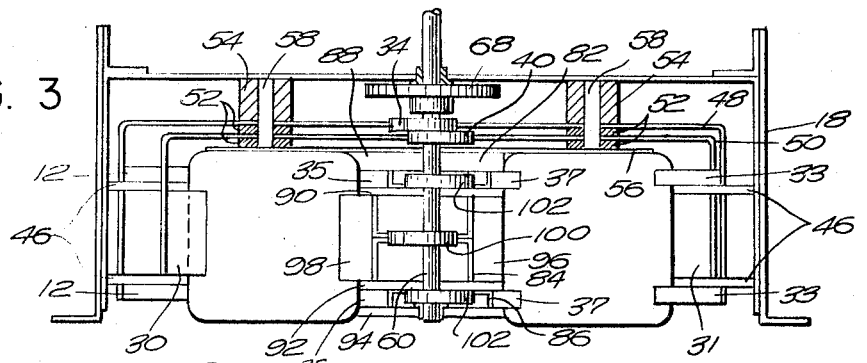
FIG. 3 is a top view of the magazine station transfer mechanism.
Figure 4:
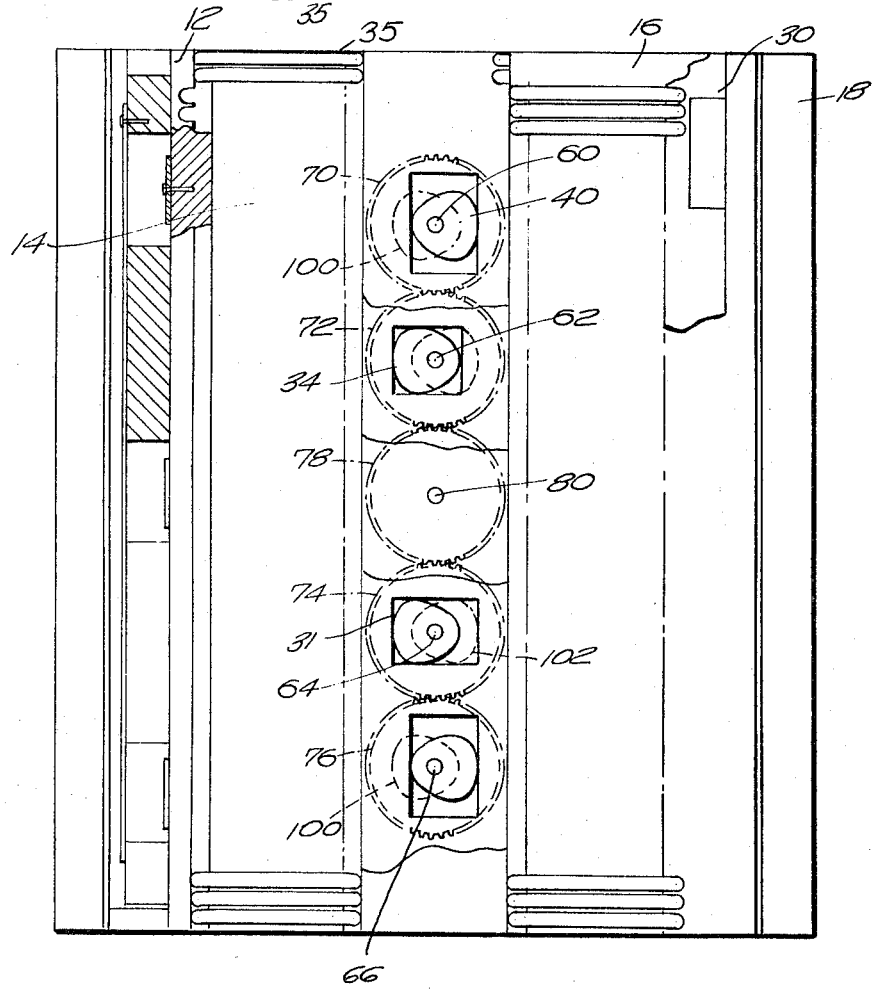
FIG. 4 is a front view with cut away sections of the magazine station transfer mechanism.

FIGS. 3 and 4, which are top and front views with cut away sections respectively of the magazine 18, omit the shuttles for clarity. Magazine 18 comprises a vertical y elongated plate with two vertical sides extending forwardly and perpendicularly therefrom to form a channel shaped housing for the entire sample rotating mechanism. Adjacent to and within this housing are a pair of similarly shaped sections 48 and 50 mounted in parallel and separated by a pair of spacers 52 and 54. An elongated plate 56 is rigidly attached to magazine 18 by four pins, two of which are shown at 58, the other two being remote from and directly below those shown. Elongated comb-like holding jaws 30 and 31 are rigidly attached to section 50 and similar elongated comb-like jaws 12 and 33 are attached to section 48 and are biased toward the center of the magazine and each other. Both sections 48 and 50 are slidably moveable in parallelism to plate 56. In consequence, section 48 is capable of free motion laterally as well as longitudinally and section 50 is confined to a lateral motion only by pins 58. Two elongated abutments 46 are permanently attached to each side of magazine 18, being biased toward the center of magazine 18 to confine the travel of the sample-holders.

Two cams 40 drive section 50 in a horizontal motion and two cams 34 drive section 48 in a motion that is both horizontal and vertical. The latter motion more accurately is described as following a profile that resembles the square in shape. Cams 40 and 34 are rigidly attached to a pair of shafts 60 and 66. Cams 34 and 31 are similarly attached to a pair of shafts 62 and 64. Cams 40 are vertically in line and in phase with each other and cams 34 are vertically in line, in phase with each other and 180° out-of-phase with cams 40. Rigidly attached to shafts 60, 62, 64, 66 and 80 are gears 70, 72, 74, 76 and 78, respectively. The gears are linearly intermeshed in a longitudinal arrangement in the center portion of the magazine adjacent to housing 18 and section 48. Driving gear 78 is rigidly attached to shaft 80 in order to transmit power from a motor 128, shown in FIG. 6, to which it is coupled.

Located in the center of the housing is a second series of moveable elongated jaw holders 82, 84 and 86, separated by a plurality of rigidly mounted elongated plates 88, 90, 92 and 94, all disposed in a vertical sequence that extends in substantial parallelism with respect to the front surface of magazine 18. These plates form two columns 14 and 16.

A set of elongated comb-like jaws 96 and 98 are rigidly attached to elongated channel shaped jaw holder 84 and extend longitudinally to the extremities thereof. Jaws 96 and 98 are biased in a manner opposed to each other, jaw 98 being directed toward column 14 and jaw 96 being directed toward column 16. In a similar manner, comb-like jaws 35 and 37 are rigidly attached to elongated channel shaped jaw holders 82 and 86. Jaws 35 and 37 are each disposed in a manner opposed to each other, jaw 35 being in the same direction as jaw 98 and jaw 37 being in the same direction as jaw 96.

Two elongated rectangular holes are located in the center of jaw holder 84 in substantially the same relative position longitudinally as those in and receive two cams 100.

Substantially square holes are located in the centers of jaw holders 82 and 86, each hole being relatively in the same position as the corresponding hole behind it. Thereby jaw holders 82 and 86 receive cams 102, which are similar to cam 40 in shape. Each of the two cams is rigidly attached to a shaft, one being attached to shaft 62 and the other to shaft 64. Both cams are positioned with their high points oppositely oriented, i.e. 180° out of phase, with respect to cams 34 and 40.

By the gearing shown in FIG. 4, if gear 78 is driven in a clockwise direction, gears 72 and 74 rotate in a counter clockwise direction, and gears 76 and 68 rotate in a clockwise direction. Therefore jaw holders 86 and 82 are driven in opposing directions with respect to jaw holder 84. Sections 48 and 50, in consequence, are driven in opposing directions with respect to each other, thereby causing jaws 98 and 30 to move inwardly in column 14 so as to retain the sample-holders. At the same time jaws 12 and 35 move outwardly in column 14 and in a downward direction to the next station in order to advance all the sample-holders upwardly one station in column 14. It follows that the operation of column 16 is the reverse of the operation just described with respect to column 14. In other words, the sample-holders are moved downwardly one station by each revolution of driving gear 78.

Figure 5:
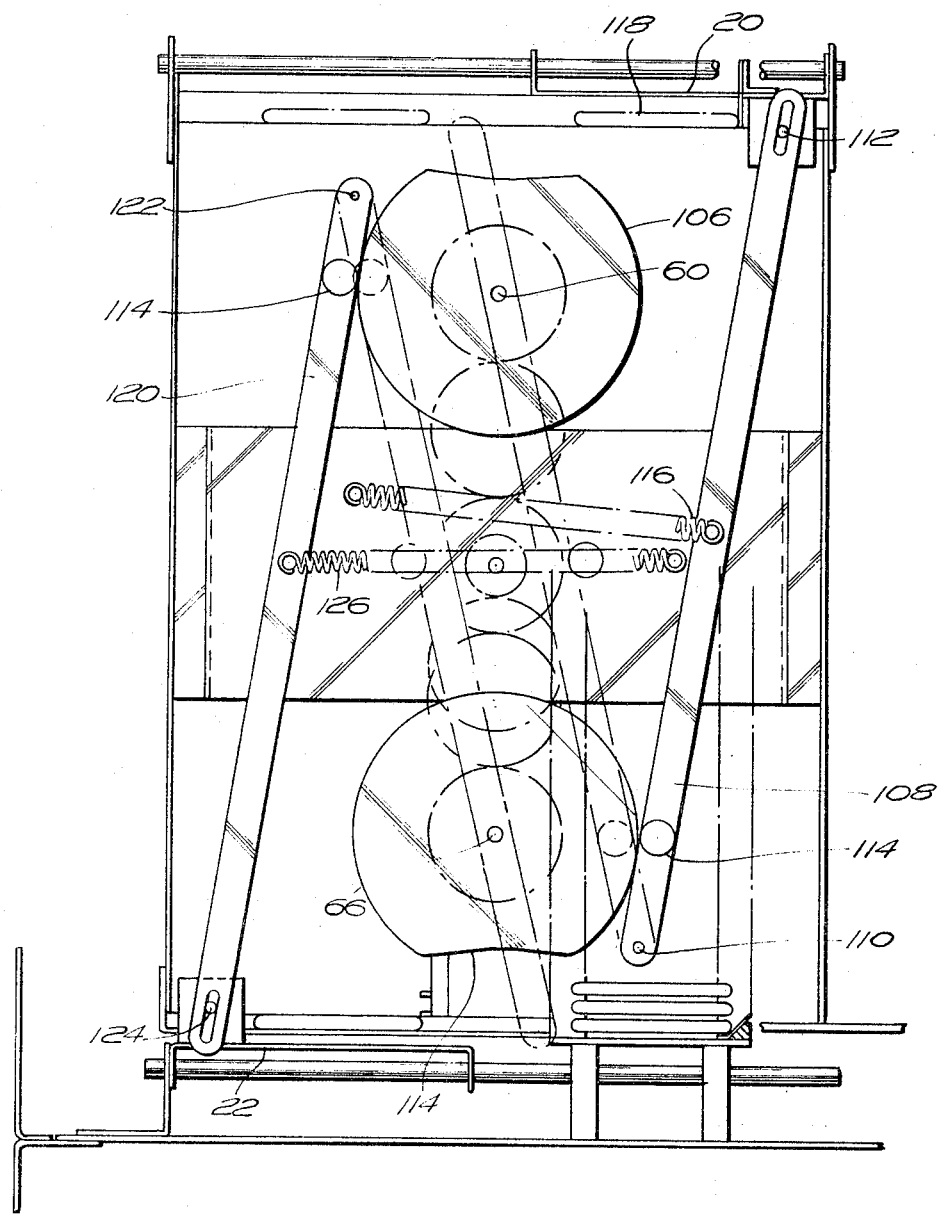
FIG. 5 is a rear view of the magazine.

The operation of the shuttle to sequentially move the sample-holders first from column 14 to column 16 and back to their original positions in column 14 by way of lower shuttle 22 is shown in FIG. 5, which is a rear view of the magazine. Extending through the rear of the magazine are the two gear shafts 60 and 66, to which are rigidly attached two cams 104 and 106. Pivotally connected to the rear of the magazine housing by pins 110 and 122 are two arms 108 and 120. Arm 108 extends upwardly to pin 112, which is rigidly connected to shuttle 20. Arm 120 extends downwardly to pin 124, which is rigidly connected to shuttle 22. Both arms 108 and 120 have elongated slots at their ends that are connected to pins 112 and 124 in order to enable free motion when shuttles 20 and 22 are moved. A free rotating cam follower 114 is attached to arm 108 and to arm 120, each in a position longitudinally in line with the corresponding cam center, and adjacent to the edge of the corresponding cam. Arm 108 follows cam 104 and arm 120 follows cam 106. A tension spring 116, which is attached to arm 108 and to the rear of the magazine housing, urges the arm in a direction toward cam 104. A spring 126, which is attached to arm 120 and the rear of the magazine housing, urges the arm in a direction toward cam 106. The cams are mounted so that followers 114 can reach the low points on the cams at the proper time for the shuttles 20 and 22 to advance a sample-holder 118 (FIG. 5) from one column to the other.

Figure 6:
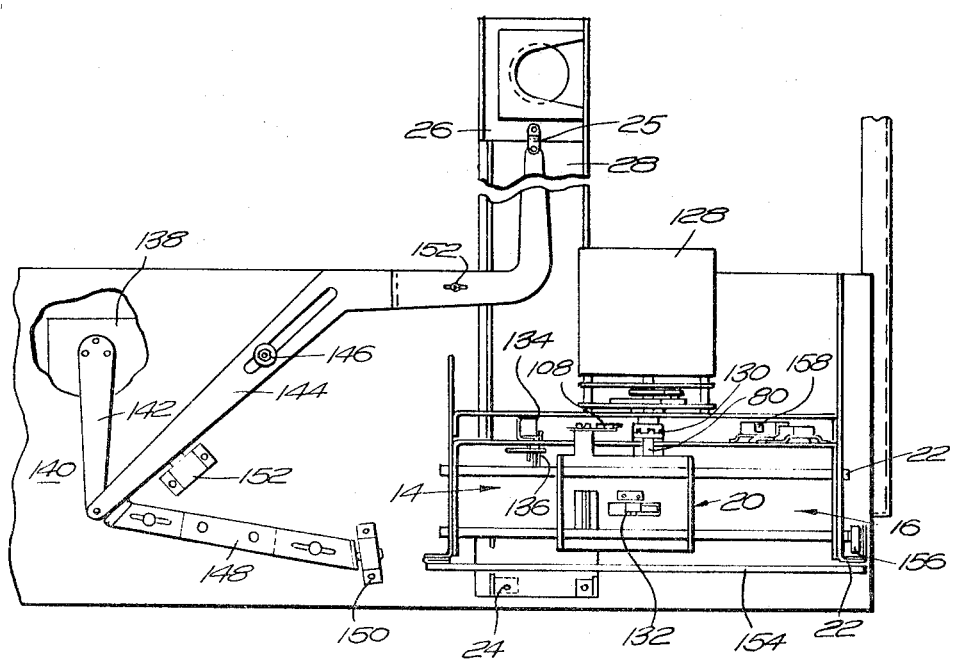
FIG. 6 is a plan view of the magazine mechanism and the transport mechanism, illustrating their interrelationships.

FIG. 6 is a plan view of the entire magazine mechanism linked to the transport system. Shown here is motor drive 128, which is rigidly attached to the rear of the magazine housing, and a coupling 130, for driving shaft 80. Shuttle 20 is shown in a moving position along rods 22, with a spring retainer 132, mounted on shuttle 20 to help carry the sample-holders from one column to the other. Carrier 26 is shown at the remote position of track 28 and in an area for sensing by a detector. A switch 134 with a wiper actuator 136 is attached in the lower rear section of column 14 of magazine 18 to signal the passing of the final sample and to shut off the entire system.

An arm 142 is firmly coupled to the output shaft of motor 138, which is rigidly attached to a base 140. Pivotally connected to arm 142 is a transport arm 144, which is joined to carrier 26 by link 25. An elongated slot in the transport arm allows for a slidable motion of the transport arm on a pivot bearing 146. The end of transport arm 144 moves carrier 26 substantially rectilinearly along track 28, when the motor drives arm 142 in either of the two directions it travels. When transport arm 144 is moved into the position shown in FIG. 6, actuator 148 is moved to limit switch 150, thereby reversing the direction of rotation of motor 138.

A plurality of limit switches such as 152, controlled by scalers, timers or printers, may be added to inhibit the transport motor and thereby to limit the time for either in or out position of the carrier. A switch 156 is attached to magazine 18 with its actuator depressed against a door 154, which encloses the front of the magazine. Opening the door opens switch 156 and shuts off motor 128. A switch 158 ensures stopping with all jaws in loading position. Arm 108 actuates the limit switch to stop at precisely loading position.

Since certain changes may be made in the above apparatus without departing from the scope of the object herein involved, it is intended that all matter disclosed herein, or shown in the accompanying drawings be interpreted in an illustrative and not a limiting sense.

What is claimed is:

1. An automatic sample changer for measuring radioactivity of samples, said sample changer comprising a sample-holder storage support means, a sample-holder transport means, and a circuit means, said sample-holder storage support means being disposed in two vertical columns, each of said columns having a plurality of elongated comblike moveable jaws adjacent to the sides thereof, each forming a station capable of supporting a single sample-holder, means for moving each sample-holder successively from one station to another and means for moving sample-holders from one column to the other, a transport station being disposed at the base of said magazine and being supported by an elongated track horizontally perpendicular to the rear of the magazine in a plane parallel to said sample-holder, a carrier for transferring each sample-holder to the remote extremity of said track and returning it to said magazine, a mechanical linkage from said carrier to a transport arm pivotally arranged to transfer the said carrier along said track, power means for actuating said transport arm, and said circuit means for constraining the motion of said magazine and said transport means and for interrupting the operation of said storage support means.

2. An automatic sample-changer for measuring radioactivity of samples, said sample-changer comprising a vertical bi-columned sample-holder storage magazine including two columns of sample holders, and a sample-holder transport means, said sample-holder being substantially rectangularly shaped wafers with means for retaining samples, each of said columns having a plurality of elongated comblike jaws adjacent to the sides thereof and biased inwardly forming a plurality of individual sample-holder support stations for said sample-holders, holding means for said comblike jaws, a plurality of cams for driving said holding means to move one set of supporting jaws on each side of both columns in an outwardly direction from said sample-holders while a second set of comblike jaws move in an inwardly direction to advance the entire complement of samples to successive stations in an upwardly direction in one column and in a downwardly direction in the second column, said cams completing their cycle and returning the original set of supporting jaws in an inwardly direction toward the sample-holders to their original positions, two independent cam driven arms, each arm being spring actuated and pivotally attached adjacent to the back of the magazine and extending to a plurality of shuttles for moving the said sample-holders from the uppermost station of one column to the uppermost station of the second column, and for moving sample-holders from the lowermost station of said second column to the lowermost station of said first column, one of said lowermost stations being a transport station supported by a track, means for moving a sample-holder from said transport station to a remote extremity of the track, and returning said sample-holder to its former position in the said magazine.

3. The apparatus of claim 2 combined with a transport system, a track to support a sample-holder carrier, a transport arm for transferring said carrier from said magazine to a detector area, and a power means, said transport arm being an elongated plate pivotally connected through a link to said carrier at one end and pivotally connected to a power driven arm at the other end, means for slideably pivoting the transport arm in an area between said both ends to confine said carrier to a substantially straight line motion along the said track.

4. The apparatus of claim 3 combining circuit means for the operation of said magazine and said transport systems, a plurality of switching means and switch actuating means, for limiting activity and sensng means to coordinate the operation of both systems, each system being inhibited while the other is in operation, switching means for automatically stopping both systems on completion of a complete cycling of any number of a plurality of samples.

References Cited by the Examiner
UNITED STATES PATENTS

| | | | |
|---|---|---|---|
| 2,752,696 | 7/1956 | Black | 198—85 |
| 3,038,078 | 6/1962 | Kern | 250—106 |
| 3,193,684 | 7/1965 | Kingston | 250—106 |
| 3,221,781 | 12/1965 | Forsstrom | 198—85 |

EVON C. BLUNK, *Primary Examiner.*

RICHARD E. AEGERTER, *Examiner.*